(12) United States Patent
Doerr et al.

(10) Patent No.: US 9,195,079 B2
(45) Date of Patent: Nov. 24, 2015

(54) THREE PORT TRANSCEIVER

(71) Applicant: Acacia Communications, Inc., Maynard, MA (US)

(72) Inventors: Christopher Doerr, Middleton, NJ (US); Benny Mikkelsen, Newton, MA (US); Eric Swanson, Gloucester, MA (US)

(73) Assignee: Acacia Communications, Inc., Maynard, MA (US)

( * ) Notice: Subject to any disclaimer, the term of this patent is extended or adjusted under 35 U.S.C. 154(b) by 173 days.

(21) Appl. No.: 13/733,108

(22) Filed: Jan. 2, 2013

(65) Prior Publication Data

US 2013/0209020 A1    Aug. 15, 2013

Related U.S. Application Data

(60) Provisional application No. 61/582,387, filed on Jan. 1, 2012, provisional application No. 61/638,651, filed on Apr. 26, 2012, provisional application No. 61/638,656, filed on Apr. 26, 2012.

(51) Int. Cl.
*G02B 6/32* (2006.01)
*G02F 1/01* (2006.01)
*G02B 6/34* (2006.01)
*G02B 6/12* (2006.01)
*G02B 6/27* (2006.01)
*H04B 10/40* (2013.01)

(52) U.S. Cl.
CPC ............ *G02F 1/011* (2013.01); *G02B 6/12004* (2013.01); *G02B 6/2726* (2013.01); *G02B 6/34* (2013.01); *G02B 2006/1213* (2013.01); *G02B 2006/12116* (2013.01); *G02B 2006/12119* (2013.01); *G02B 2006/12123* (2013.01); *G02B 2006/12142* (2013.01); *G02B 2006/12159* (2013.01); *H04B 10/40* (2013.01)

(58) Field of Classification Search
None
See application file for complete search history.

(56) References Cited

U.S. PATENT DOCUMENTS 7,480,425 B2 *   1/2009   Gunn et al. ................. 385/2
2010/0119229 A1 * 5/2010   Roelkens et al. ........... 398/79

* cited by examiner

*Primary Examiner* — Ryan Lepisto
*Assistant Examiner* — Erin Chiem
(74) *Attorney, Agent, or Firm* — Wolf, Greenfield & Sacks, P.C.

(57) ABSTRACT

An optical coherent transceiver comprising a polarization and phase-diversity coherent receiver and a polarization and phase-diversity modulator on the same substrate interfaced by three grating couplers, on grating coupler coupling in a signal, one grating coupler coupling in a laser signal, and a third grating coupler coupling out a modulated signal.

9 Claims, 20 Drawing Sheets

THREE PORT TRANSCEIVER

CROSS REFERENCE TO RELATED APPLICATIONS

This application claims the benefit of U.S. Provisional Patent Application Ser. No. 61/582,387 filed Jan. 1, 2012, U.S. Provisional Patent Application Ser. No. 61/638,651 filed Apr. 26, 2012, and U.S. Provisional Patent Application Ser. No. 61/638,656 filed Apr. 26, 2012, which are incorporated by reference in their entirety as if set forth at length herein.

TECHNICAL FIELD

This disclosure relates generally to the field of telecommunications and in particular to a monolithic, phase- and polarization-diversity coherent transceiver photonic integrated circuit.

BACKGROUND

Contemporary optical communications systems oftentimes employ optical transceivers. Given their importance to the communications arts, techniques, methods and apparatus that facilitate their operation or efficiency would be a welcome addition to the art.

SUMMARY

An advance in the art is made according to an aspect of the present disclosure directed to techniques, methods, apparatus and systems pertaining to monolithic, phase- and polarization-diversity coherent transceiver photonic integrated circuits.

Viewed from a first aspect, the present disclosure is directed to an optical coherent transceiver comprising a polarization and phase-diversity coherent receiver and a polarization and phase-diversity modulator on the same substrate interfaced by three grating couplers, one grating coupler coupling in a modulated signal, one grating coupler coupling in a continuous-wave (cw) signal, and a third grating coupler coupling out a modulated signal.

BRIEF DESCRIPTION OF THE DRAWING

A more complete understanding of the present disclosure may be realized by reference to the accompanying drawings in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

Figure 1:
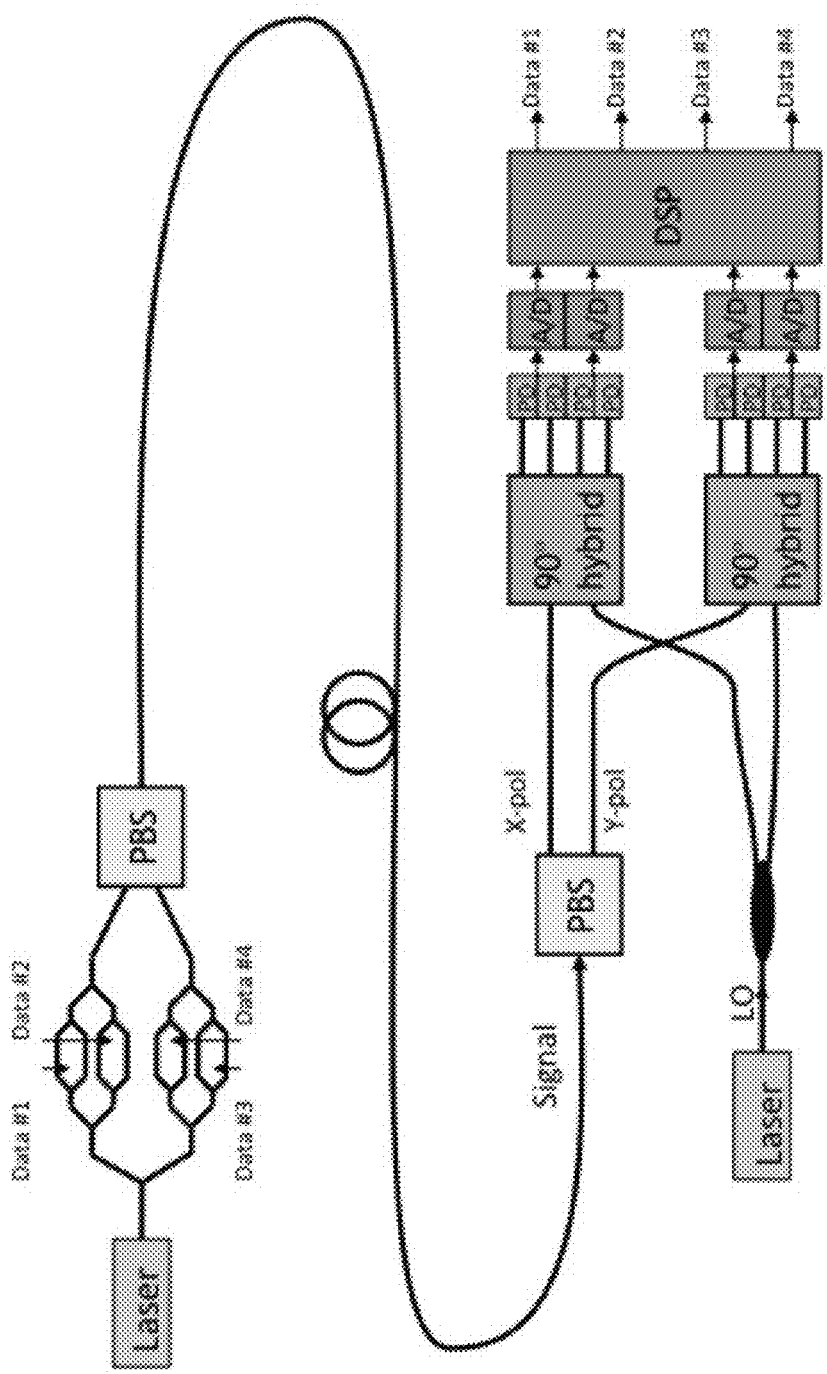
FIG. 1 shows coherent link according to the Prior Art.

By way of some additional background, we note that generally, optical polarization- and phase-diversity coherent transmission systems are constructed using a receiver module having two optical input/output (I/O) ports, a modulator module having two optical I/O ports, and two laser modules each having one I/O port. Such systems are physically large, expensive and include many optical interconnects as shown in FIG. 1. As generally shown in that FIG. 1, light emitted from a laser is modulated by a number of data streams through the effect of a modulator and subsequently applied to an optical fiber span after output from a polarization beam splitter. This modulated light is received by a polarization beam splitter which splits the received light into X-polarization (X-pol) and Y-polarization (Y-pol) components. These X-pol and Y-pol components are applied to a respective 90° hybrid along with a local oscillator signal wherein it is subsequently detected, digitized and processed resulting in output data that corresponds to the modulator data applied by the modulator. Coherent systems such as those depicted in FIG. 1 are well known in the art.

Figure 2:
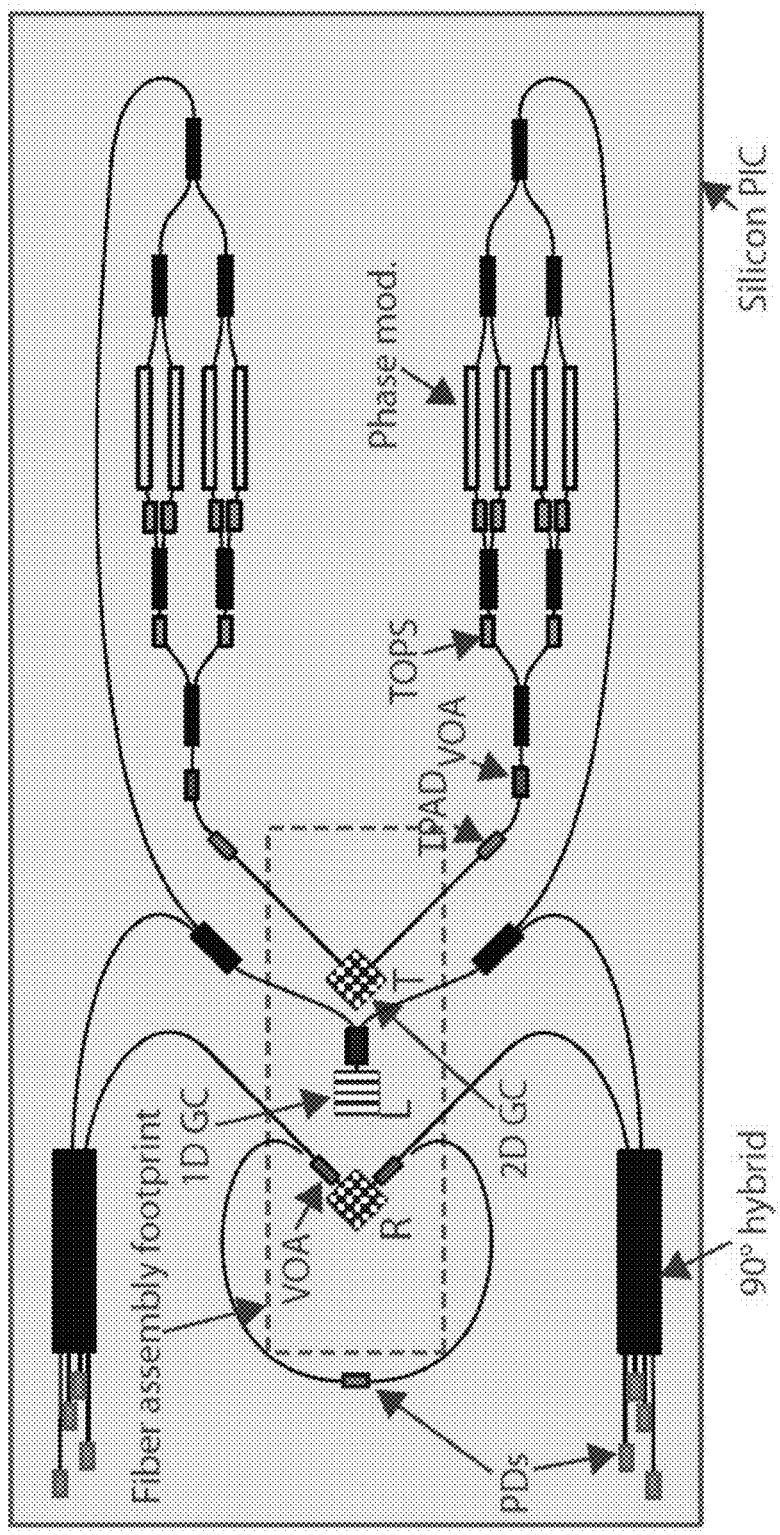
FIG. 2 shows a schematic top-view of an exemplary 3-port coherent transceiver photonic integrated circuit (PIC) according to an according to an aspect of the present disclosure.

Turning now to FIG. 2, there is shown an exemplary 3-port PIC according to an aspect of the present disclosure. As will become readily appreciated by those skilled in the art, the 3-port PIC depicted in FIG. 2 is constructed as a monolithic photonic integrated circuit having three optical I/O ports, and a separate laser module thereby reducing the size, cost, and number of optical interconnections as compared to the prior art. Advantageously, the exemplary 3-port PIC employs the same, single laser for both transmitter and local oscillator. This allows the requirement for only 3 optical I/O ports. In the prior art, one would have one receiver PIC, needing 2 optical I/O ports and one modulator PIC, needing 2 optical I/O ports, for a total of 4 optical I/O ports. Reducing the number of optical I/O ports reduces the cost and footprint of the transceiver. Since the laser is housed in a separate module, a device according to the present disclosure does not require normal temperature control mechanisms. Further features and operational characteristics will become apparent in the following discussion.

As depicted in this FIG. 2 and throughout the remaining drawing figures, the following nomenclature is used. PD=photodiode; TOPS=thermoptic phase shifter; VOA=variable optical attenuator; TPAD=two-photon absorption diode; GC=grating coupler; R=receive signal in port; L=laser in port; and T=transmit signal out port.

With continued reference to FIG. 2, light from a cw laser is applied to port "L" where it is optically conducted to both a receiver portion and a modulator portion of the PIC. Generally, the L port is a 1-D grating coupler which operates as an efficient fiber coupler. Advantageously, when a focusing 1D grating coupler is employed as the L port, a short output taper is possible. Ports "R" and "T" are 2-D grating couplers, which also serve as fiber couplers and polarization splitters and rotators.

Once received by the L port, laser light is directed to both the receiver and modulator portions of the PIC. Generally, the laser light so received is split in a 50/50 manner, although other split ratio(s) are possible and contemplated.

An optical signal is received by the R port grating coupler and is directed to two optical 90° hybrids and integrated photodiodes (PDs). As may be appreciated, the photodiodes may be advantageously constructed as Germanium on Silicon (Ge-on-Si) structures.

As may be observed from FIG. 2, modulator outputs are optically connected to the T port grating coupler.

Advantageously, there are no waveguide crossings according to the present disclosure and therefore a low crosstalk and low insertion loss device is achieved. A further aspect of the present disclosure is that the receiver and modulator(s) are positioned at opposite ends of the overall PIC, thereby minimizing any electrical and/or optical crosstalk or other interference during operation.

Received, Transmitted and Laser light is preferably coupled in-to and out-of the PIC using a 3-fiber array having high-index-contrast fiber such that it may be bent to a small radius. A small bend radius is advantageous as it permits a thin, overall profile while permitting the fibers to attach nearly perpendicular to the PIC surface.

Figure 3:
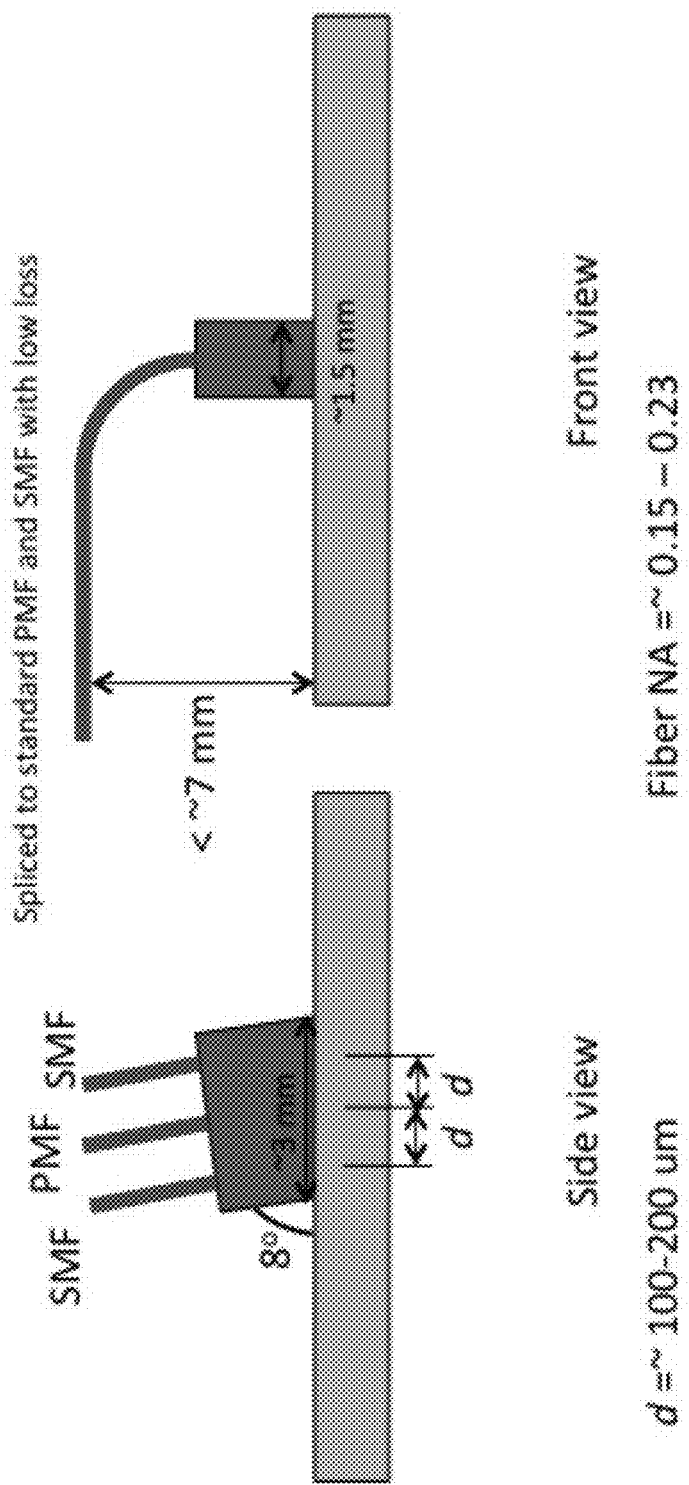
FIG. 3 shows a schematic side view of fiber assembly according an aspect of the present disclosure.

FIG. 3 shows a schematic drawing of the fiber assembly according to an aspect of the present disclosure. As depicted in that FIG. 3, one may observe from the side view that the fiber assembly is shown as "tilted" by an amount of 8° from the perpendicular with respect to the PIC surface. Such tilting advantageously avoids strong Bragg back reflection(s) from the grating coupler(s) as light is directed from waveguide to a grating coupler.

With continued reference to FIG. 2, it may be observed that an integrated received optical power monitor is in optical communication with the R port shown at the far left of the PIC depicted in FIG. 2. As depicted, the integrated received optical power monitor comprises a photodiode that receives a portion from each of the received polarization components. Advantageously, the same, single received optical power monitor photodiode receives the portions at opposite ends of the photodiode. As may be appreciated, such a structure may also include an integrated tunable filter—such as a ring resonator filter depicted in FIG. 4. Such a filter may be tuned across a broad spectrum and thereby perform as in integrated spectrum analyzer.

As further depicted in FIG. 2 a pair of variable optical attenuators (VOAs) are positioned at the receiver R input. Such VOAs may be p-n junctions with carrier injection on a silicon waveguide. With such devices, as more carriers are injected the loss increases due to free-carrier absorption.

The VOAs may used to advantageously increase the dynamic range of the receiver. More specifically, when received signal power is high, the VOAs may be used to reduce the amount of signal reaching the photodiodes. Consequently, this relaxes the dynamic range requirement on transimpedance amplifiers (TIAs).

As may be further observed in FIG. 2, VOAs may be included on the transmit output, positioned between the modulators and the T port. These also may be p-n junction devices with carrier injection in the silicon waveguide. Furthermore, taps and photodiodes (not specifically shown) may be positioned after the VOAs for providing a feedback signal to the VOAs. Alternatively, two-photon-absorption (TPA) diodes such as those shown may be employed. The VOA so positioned in the output may advantageously reduce transmit polarization dependent loss (PDL) as well as control transmit power.

As may be appreciated, an inline TPA diode generally is a reversed-biased p-n junction on the silicon waveguide. It produces a photocurrent proportional to the square of the optical power passing through the waveguide. This diode serves a dual role of photo detecting and rectifying, which is needed to measure the RF power such that it may be affected by a control loop that controls the modulator phase between the I and Q components.

An alternative to using a TPA diode is to use a tap and a conventional photodiode. Such an arrangement is shown schematically in FIG. 5. In this case shown, the PD photocurrent may be rectified to provide feedback for the I-Q phase control.

Continuing with our general discussion with particular reference to FIG. 2, the modulators shown comprise nested Mach-Zhender modulators—sometimes referred to as "I-Q" modulators. Each of the two phase modulators comprising the nested unit Mach-Zehnder modulators are preferably driven push-pull, and may be advantageously fabricated as depletion modulators in silicon. Shown further in the figure, the modulators may include thermooptic phase shifters (TOPS). As may be appreciated, such TOPS are integrated heaters that locally heat a waveguide portion, changing its refractive index and thereby used to adjust the relative optical phase in the interferometers.

Figure 4:
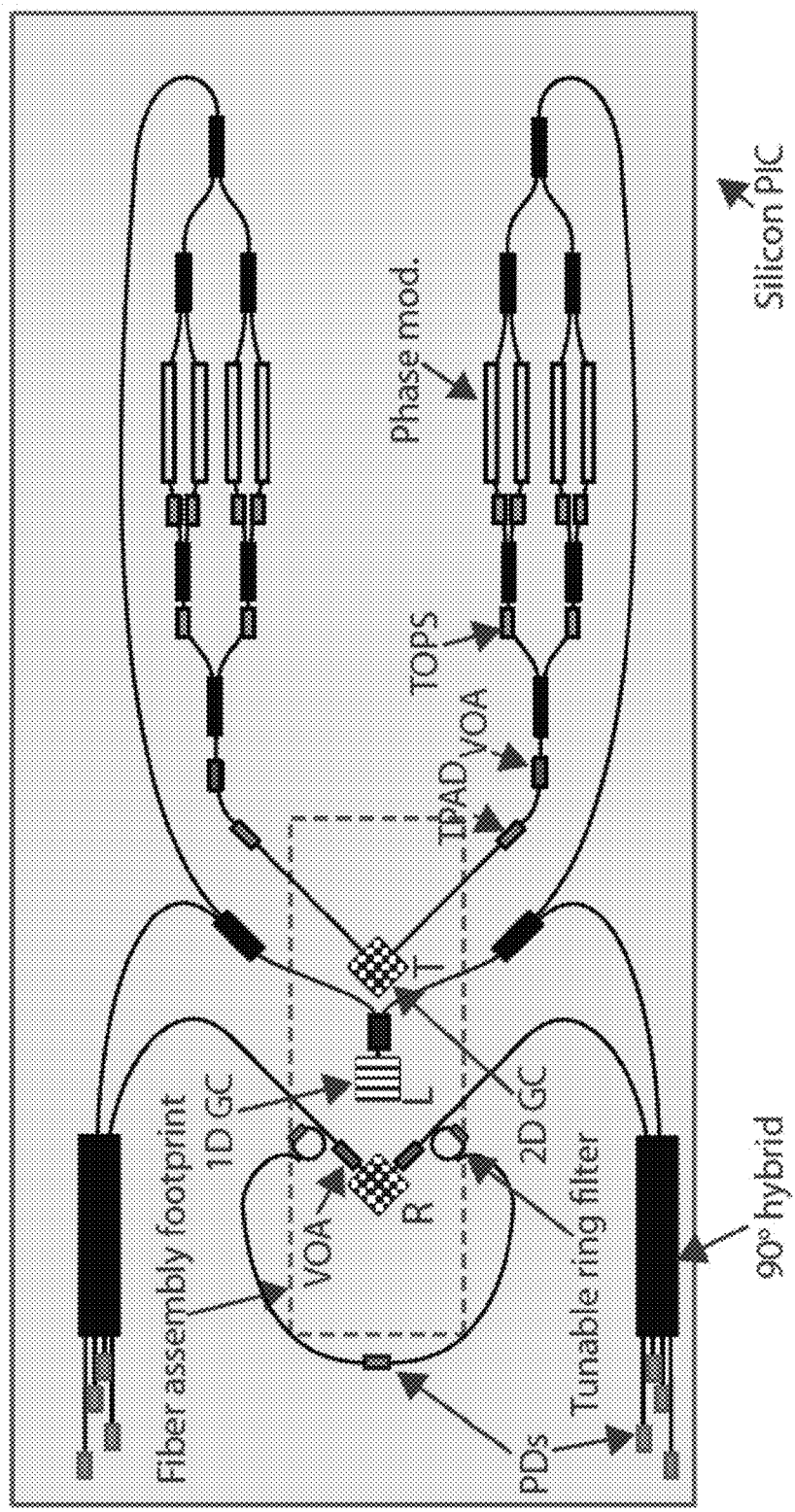
FIG. 4 shows a schematic top view of a 3-port coherent transceiver PIC using a tilted fiber array according to an aspect of the present disclosure.
Figure 5:
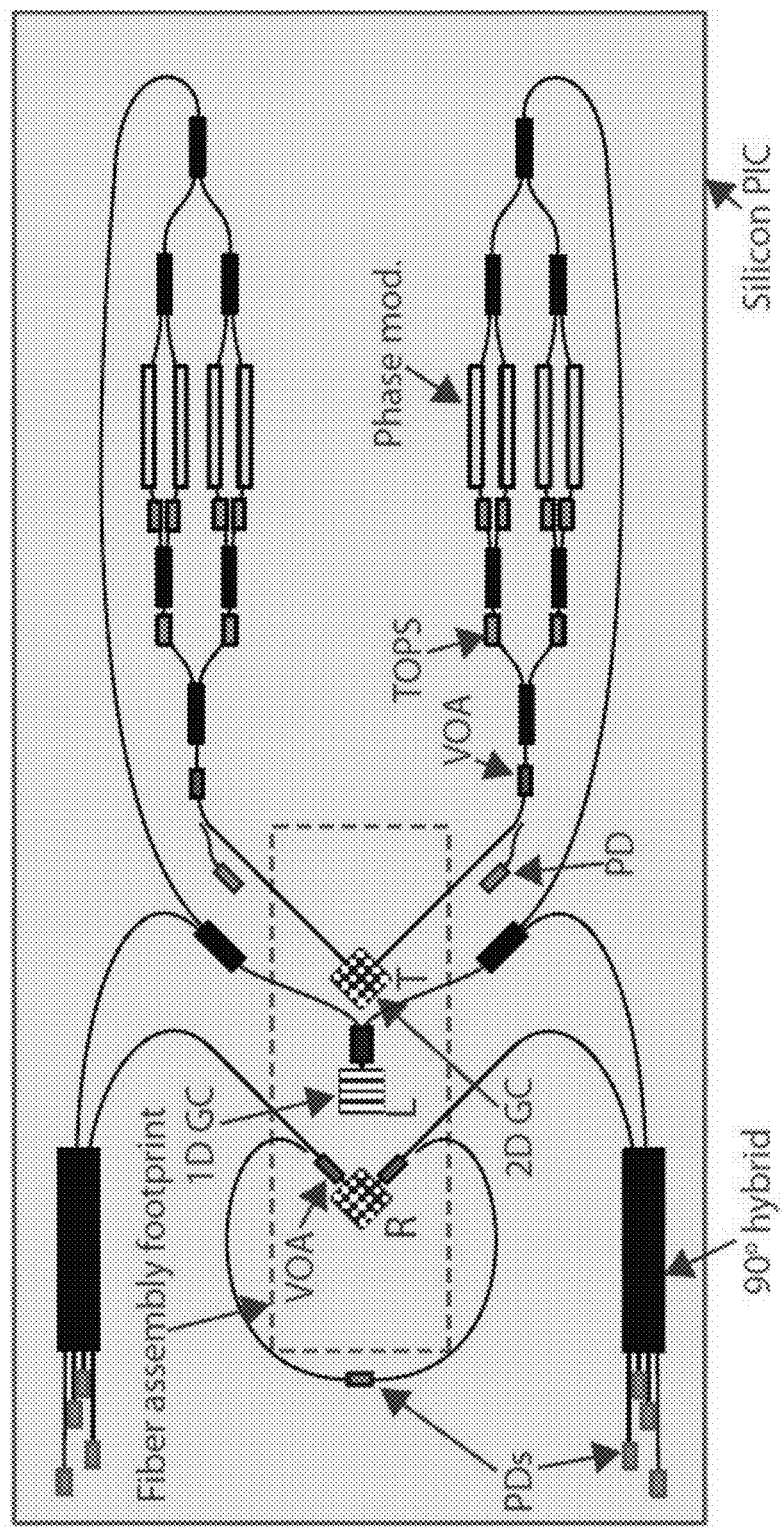
FIG. 5 shows a schematic top view of a 3-port coherent transceiver PIC using a tilted fiber array according to another aspect of the present disclosure.
Figure 6:
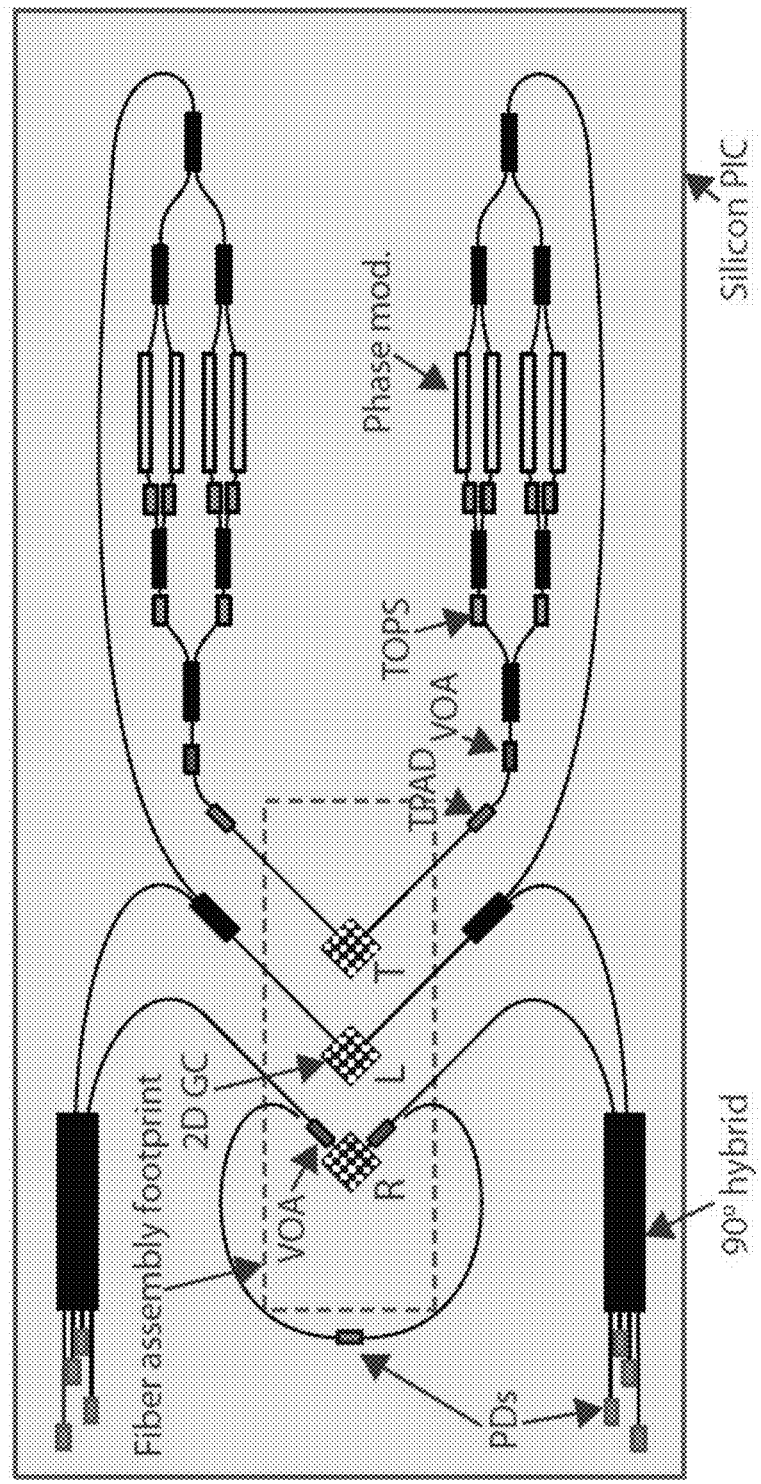
FIG. 6 shows a schematic top view of a 3-port coherent transceiver PIC using a tilted fiber array according to yet another aspect of the present disclosure.

As described herein to this point, the L port depicted in FIGS. 2, 4, and 5 is a 1-D grating coupler. This is due to the fact that the input laser exhibits a single polarization, and a 1-D grating coupler typically exhibits a lower insertion loss than a 2-D grating coupler. Notwithstanding this noted advantage, those skilled in the art will appreciate that a 2-D grating coupler may be used instead, as depicted in FIG. 6.

Figure 7:
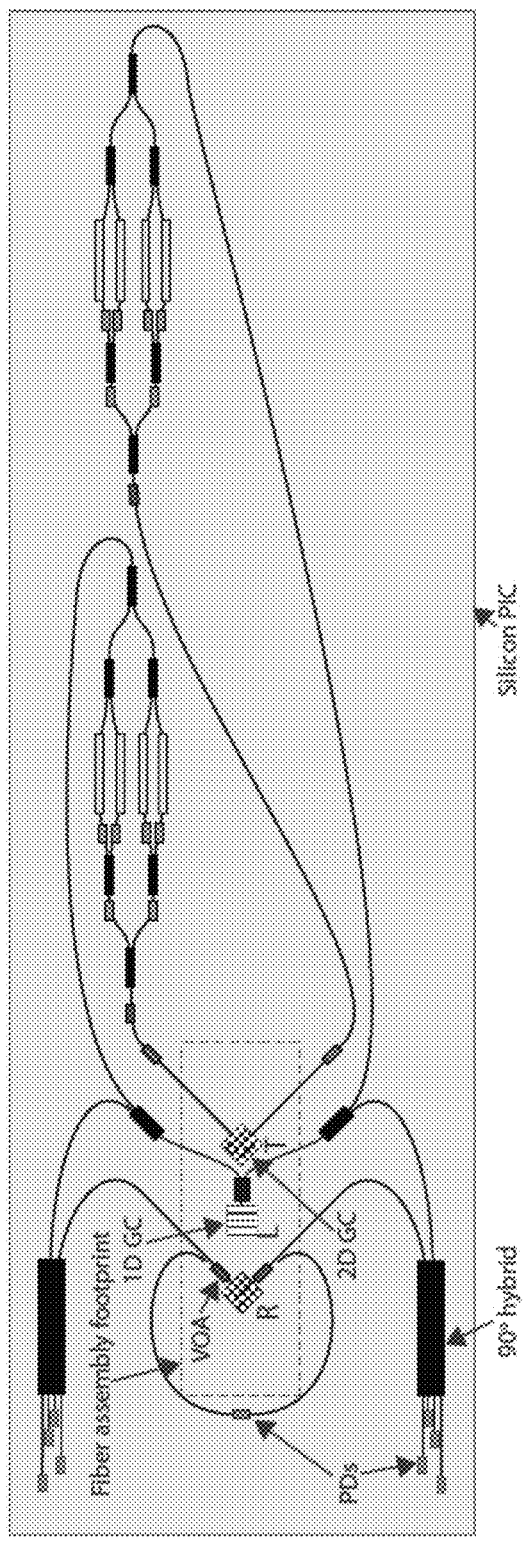
FIG. 7 shows a schematic top view of a 3-port coherent transceiver PIC using a tilted fiber array in which modulators are arranged along long edge of PIC according to an aspect of the present disclosure.

As may be appreciated, alternative configurations using the same or similar R, L, and T configuration of grating couplers are possible and contemplated, whereby the receiver PDs and transmitter modulators are arranged at different locations on the substrate chip—depending upon how the electrical connections are made. For example, if it was desired to spread out the electrical connections—along one or more edges of the PIC, for example, the configuration shown in FIG. 7 may be employed. In this FIG. 7, the fiber array is tilted toward the left—in the drawing figure—and the reader is directed to modulators located such that they are spread out along the long edge of the PIC for easier electrical access.

Figure 8:
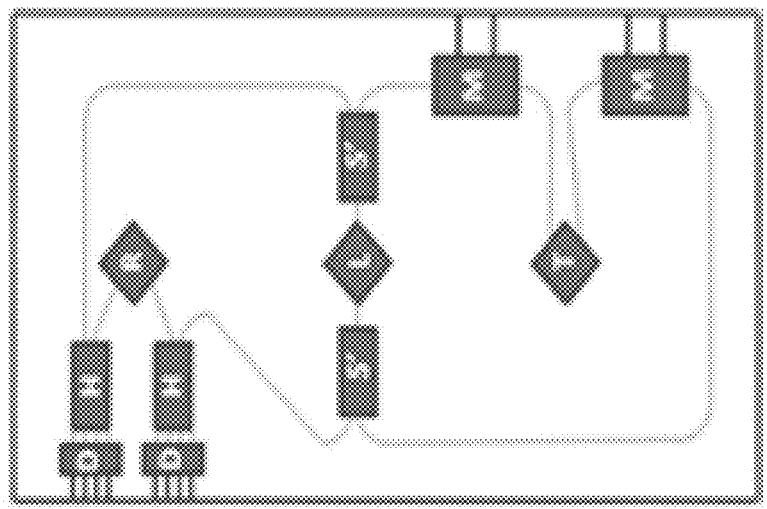
FIG. 8 shows a schematic top view of 3-port coherent transceiver PIC using a tilted fiber array with modulators arranged along a side facet according to an aspect of the present disclosure.
Figure 8:
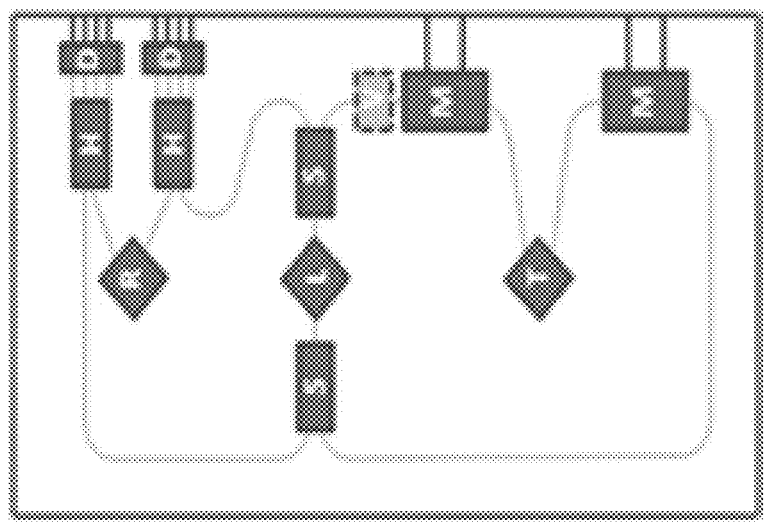

Alternative configurations, such as the one depicted in FIG. 8 result in equal path lengths from the T grating coupler to the two I-Q modulators. In such configurations, rather than being tilted in the direction along the line made by the three grating couplers, the fiber array is now tilted orthogonal to that line.

Figure 9:
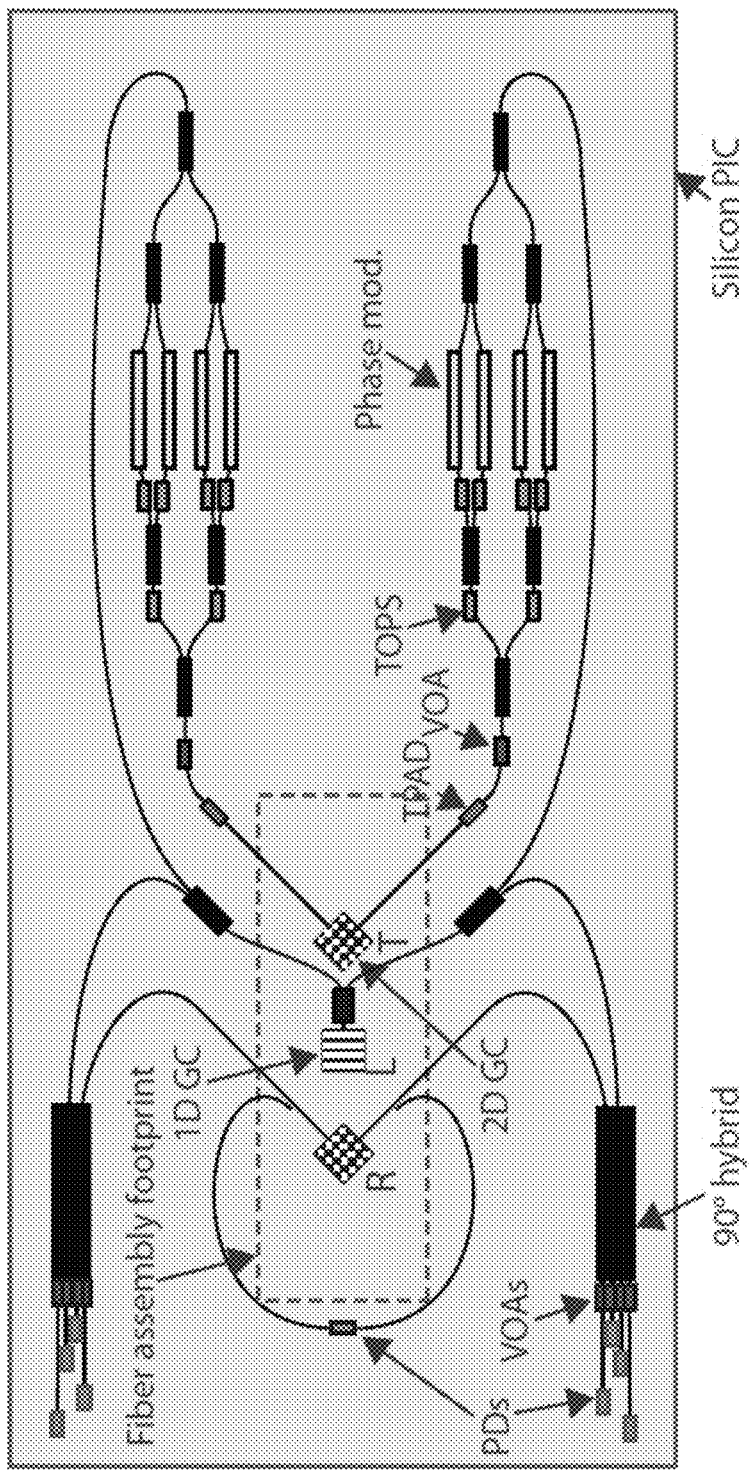
FIG. 9 shows a schematic top view of 3-port coherent transceiver PIC using tilted fiber array with variable optical attenuators (VOAs) and high-speed photodiodes (PDs) according to an aspect of the present disclosure.

Advantageously, one can include the VOAs in the Rx prior to the PDs such that the common mode rejection ratio (CMRR) may be tuned. Such an arrangement is shown schematically in FIG. 9. The arrangement shown in FIG. 9 has the fiber array tilted toward the left in the figure and permits the adjustment of the CMRR for the signal or the LO—but not both simultaneously. It is noted that it may be more likely that one would tune it for the signal as many channels could be simultaneously input to the receiver but only one is detected. Of additional advantage, when the VOAs are positioned prior to the PDs as shown, it eliminates the need for VOAs after the grating couplers—since these former VOAs can also increase dynamic range.

All of the configurations according to the present disclosure and depicted so far employ a tilted fiber array. As noted previously, the tilt to the fiber is used to avoid a strong second-order reflection of light as it is conveyed from waveguide to fiber. If the fiber is perfectly vertical, then light reflected from the grating grooves will be in phase. Since the grating is a second order grating (the period is a wavelength rather than a half wavelength—like a true Bragg grating), the reflection will be small, but not negligible and typically on the order of 25%.

Figure 10:
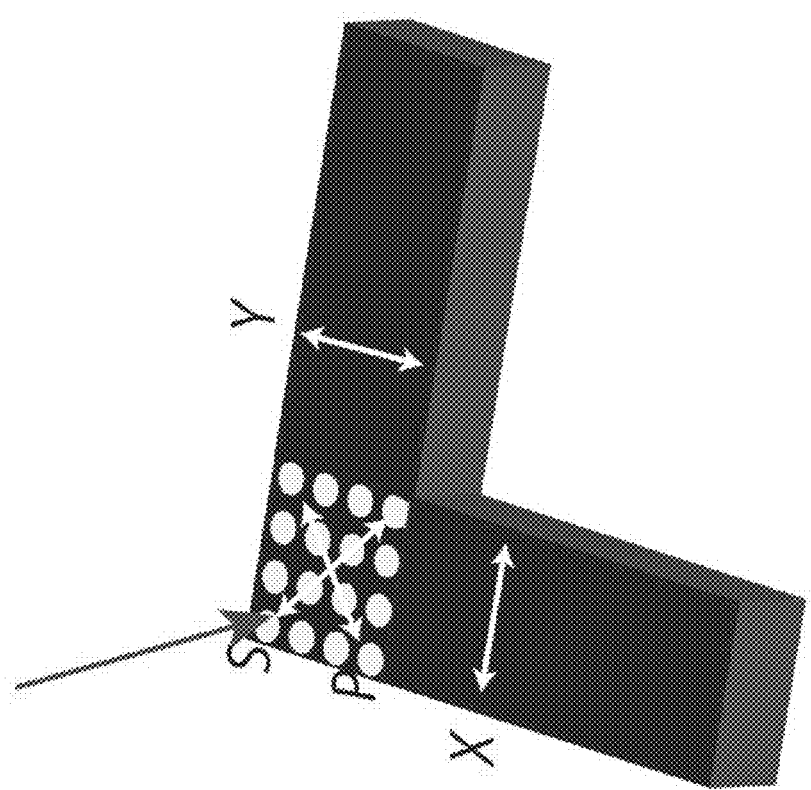
FIG. 10 shows a schematic of a 2-D grating coupler using a tilted fiber according to an aspect of the present disclosure.

FIG. 10 shows a schematic of a 2-D grating coupler using tilted fiber according to an aspect of the present disclosure. The grating coupler divides incoming light into two polarizations—X and Y—as depicted in FIG. 10. If the fiber is tilted, X and Y are not truly orthogonal. Instead, what is orthogonal is the diagonal basis set, S and P. Because the fiber is tilted along the plane that S is in, it experiences a different coupling efficiency. This is due to the fact that the polarization excites odd modes in the grating, and S excites even modes. If this coupling efficiency is represented by $\eta$, (which varies with wavelength), then the following relationships hold:

$$X+Y=S\eta; \text{ and}$$

$$X-Y=P;$$

where X and Y are not orthogonal if $\eta$ is not equal to 1. One way to make $\eta$ equal to 1 is to modify the grating hole shapes such that the even and odd modes have the same effective index. However, this requires higher resolution lithography than is normally required for silicon photonics and also may be difficult to reproduce consistently.

Figure 11:
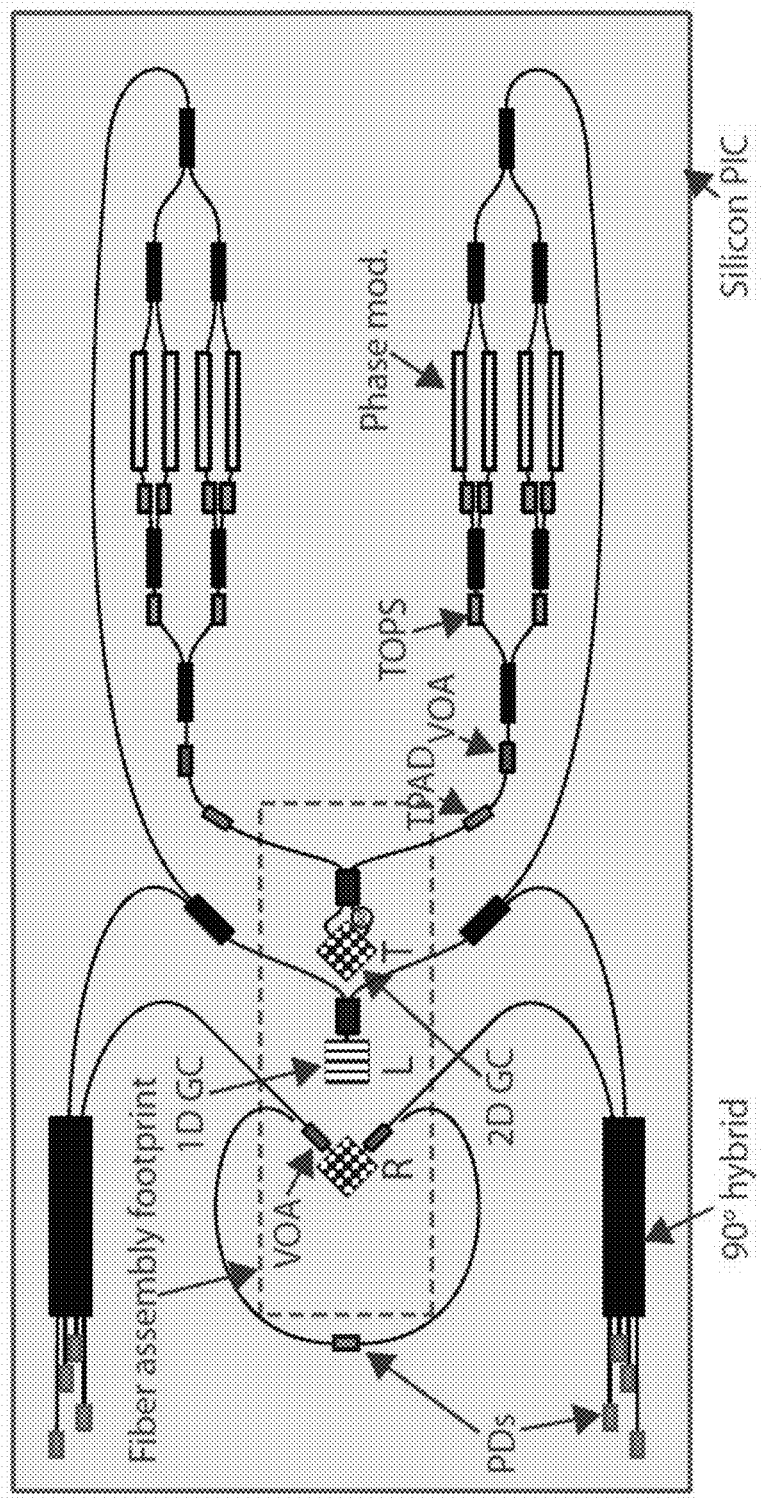
FIG. 11 shows a schematic top view of 3-port coherent transceiver PIC using tilted fiber array having an interferometer connected to transmitter grating coupler to orthogonalize the polarizations according to an aspect of the present disclosure.

Another way, according to the present disclosure, is to use an interferometer after the grating coupler as shown in FIG. 11. Where—as in FIG. 11—an interferometer is connected to the transmitter grating coupler the polarizations are made orthogonal. The interferometer interferes the X and Y polarizations such as to recreate the S and P polarizations. Then on-chip VOAs can be used to control the polarization-dependent loss (PDL).

Additionally, one could also place this interferometer (not specifically shown in FIG. 11) on the receiver grating coupler. This position is of less importance as the digital signal processor (DSP) in the receiver could perform the orthogonalization. It is more important for the transmitter to launch orthogonal polarizations because of noise loading due to optical amplifiers in the transmission line. If a polarization component is weaker it will have a lower effective optical signal-to-noise ration. If a polarization component is weaker after the noise loading, such as in the receiver, it will not have a reduced optical signal-to-noise ratio.

Yet still another way to avoid this orthogonalization issue completely is to not tilt the fibers at all. In such a case—and according to yet another aspect of the present disclosure—we may reduce the back reflection significantly by employing a type of antireflection (AR) "coating" that comprises a short Bragg grating in the waveguide at the point where it connects to the grating coupler, appropriately phased. This is similar to etching a slot to cancel the second-order Bragg reflection, but uses slots that are a quarter of a wavelength wide so that they do not cause any upward scattering.

Figure 12:
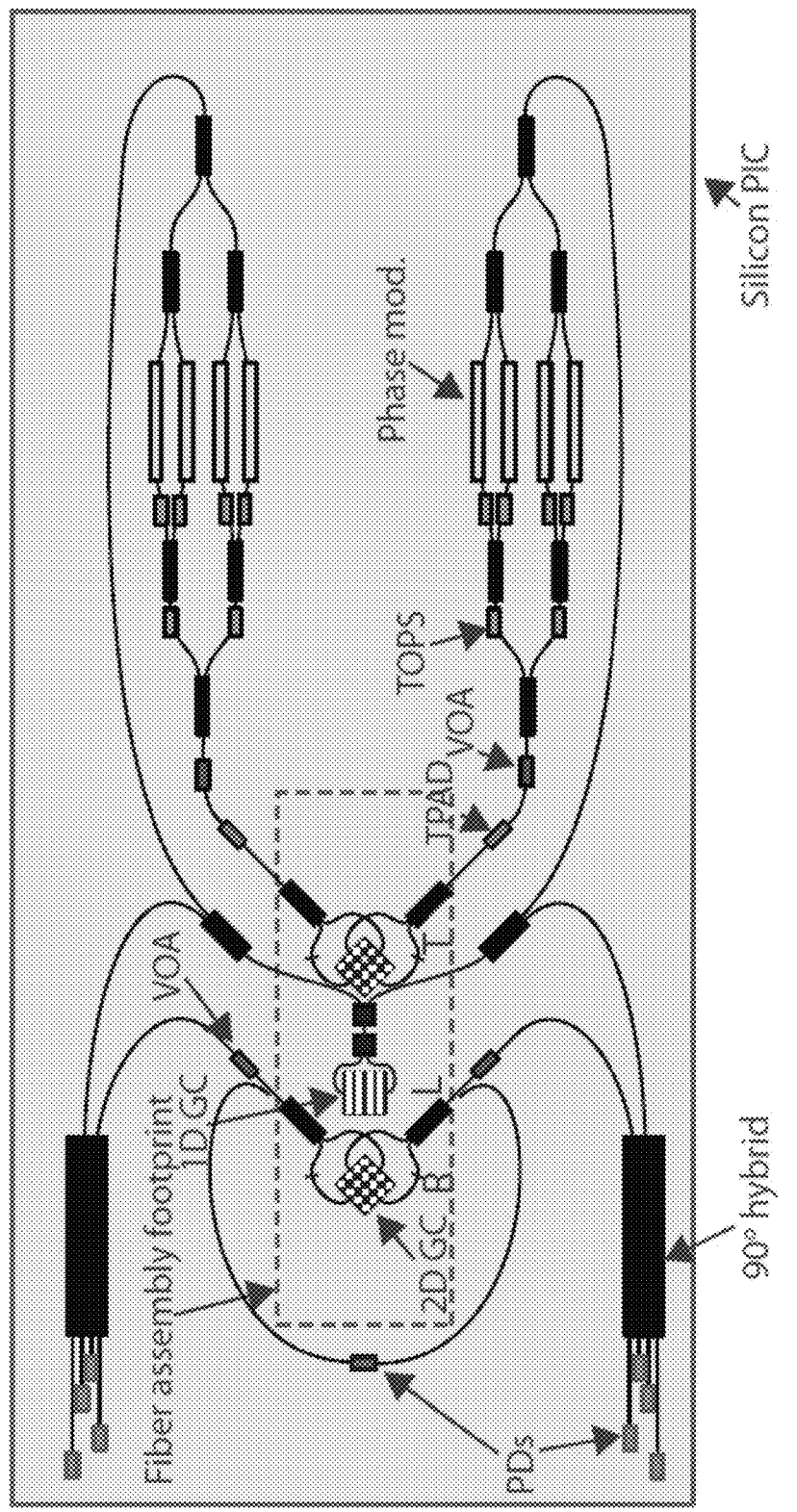
FIG. 12 shows a schematic top view of 3-port coherent transceiver PIC using a non-tilted fiber array according to a aspect of the present disclosure.
Figure 13:
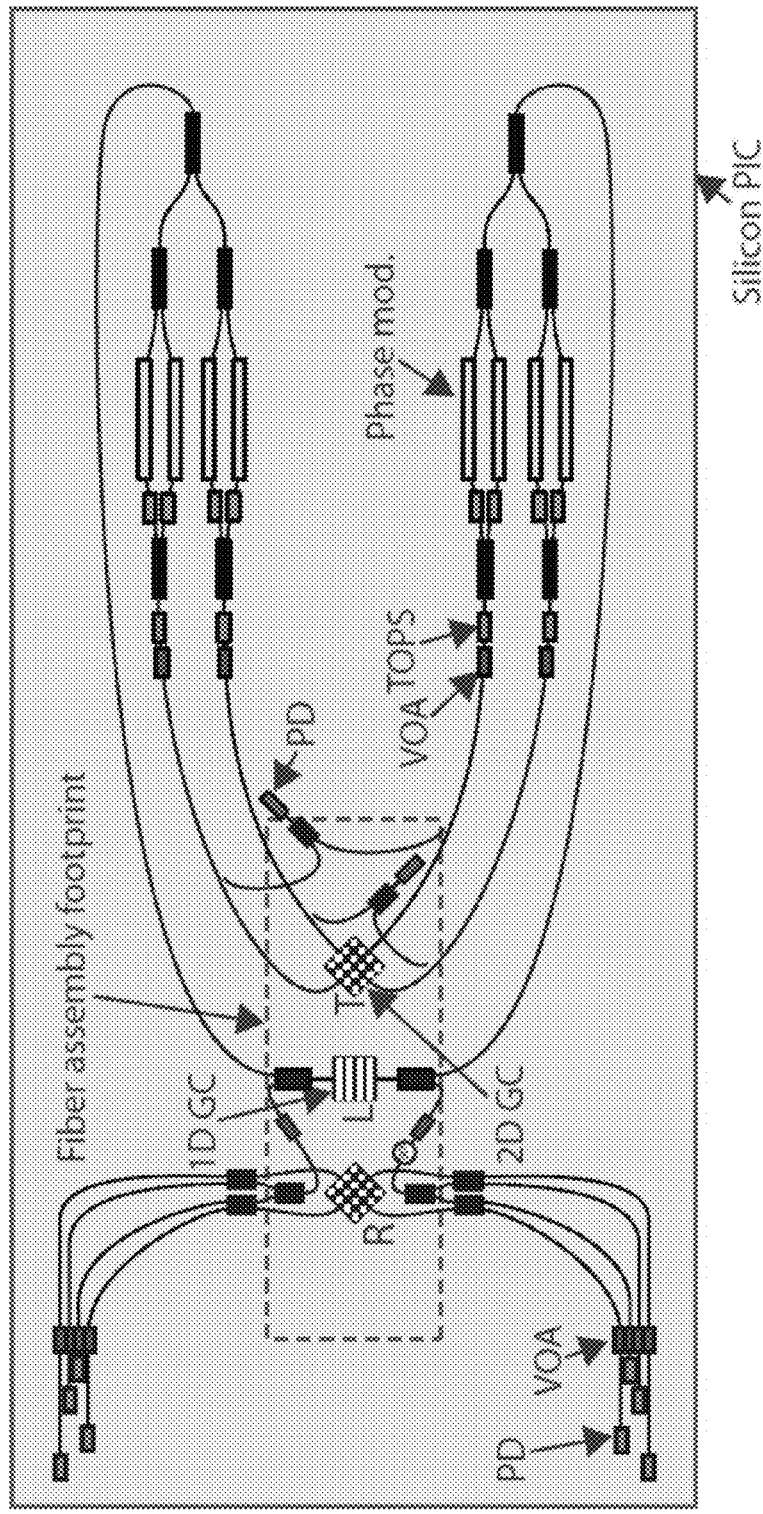
FIG. 13 shows a schematic top view of 3-port coherent transceiver PIC using a non-tilted fiber array according to another aspect of the present disclosure.

As may be appreciated, one advantage to having a vertical fiber is that the coupling efficiency is higher and the coupling bandwidth is larger. One disadvantage however, is that the light now emanates from both sides of the grating coupler. To overcome this, we can either couple the two lightwaves in 2×1 couplers, as shown schematically in FIG. 12, or use the splitting as 50/50 couplers as shown schematically in FIG. 13 and FIG. 14.

Figure 14:
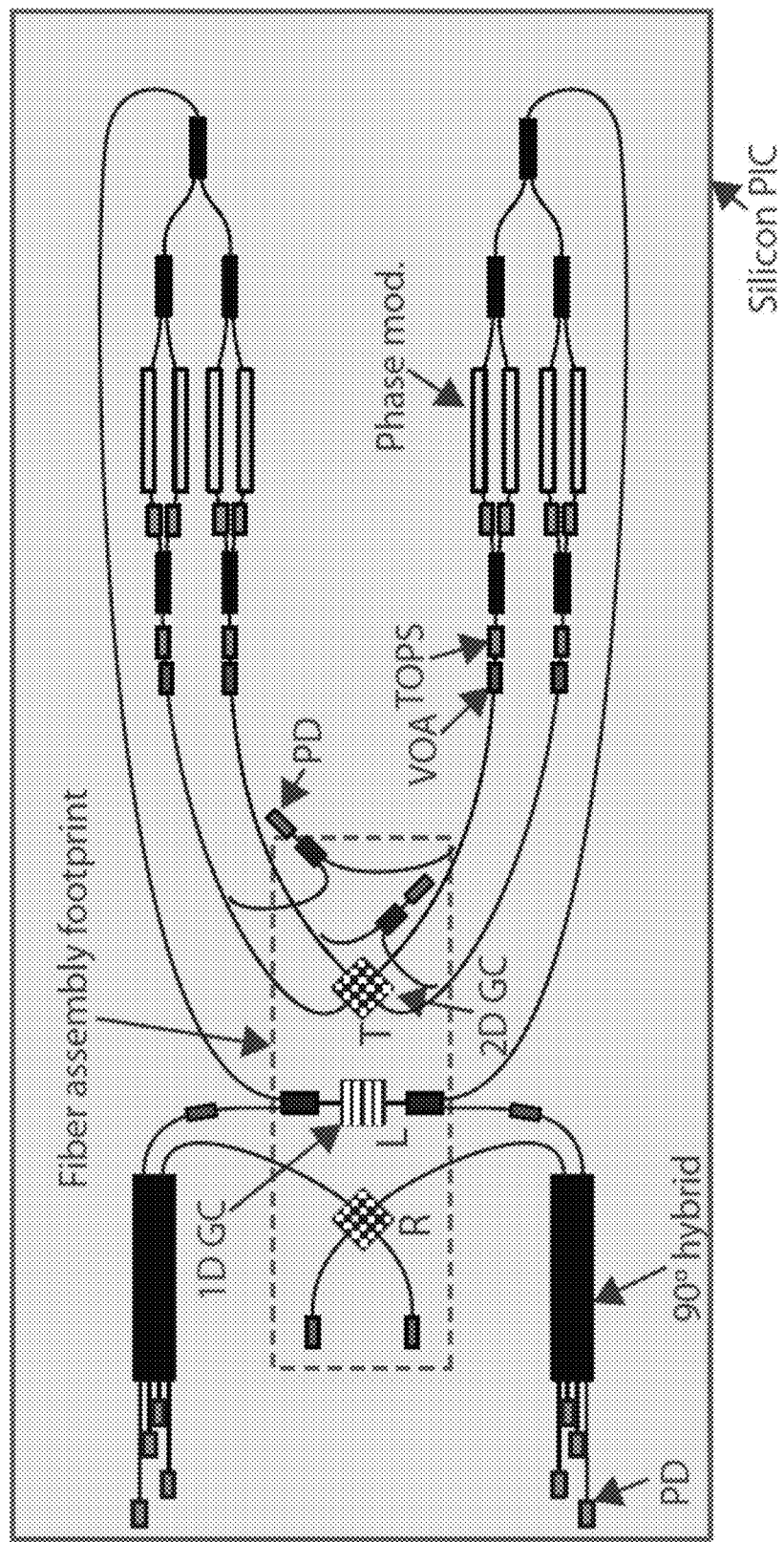
FIG. 14 shows a schematic top view of a 3-port coherent transceiver PIC using a non-tilted fiber array according to yet another aspect of the present disclosure.

In the configuration depicted in FIG. 14, the R grating is splitting to both the power monitors and the 90-degree hybrids. This results in approximately 3 dB extra loss for the receiver. To reduce this loss, one can apodize the R grating such that it sends more light to the receiver than the power monitors. Similarly, with all of these configurations, the 1-D L grating may be apodized such that it sends a larger fraction of the laser power to the receiver or modulator, as desired.

Figure 15:
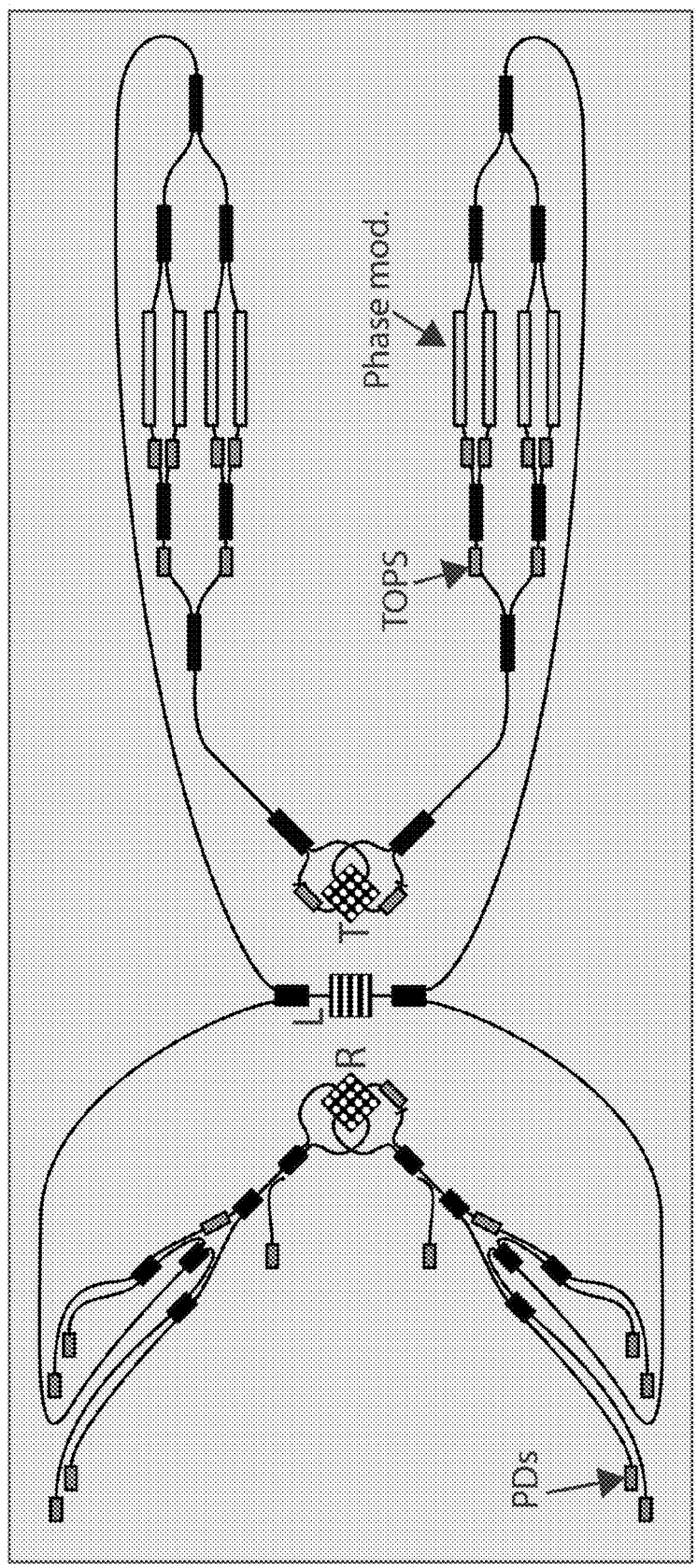
FIG. 15 shows a schematic top view of a 3-port coherent transceiver PIC using a non-tilted fiber array according to yet another aspect of the present disclosure.
Figure 16A:
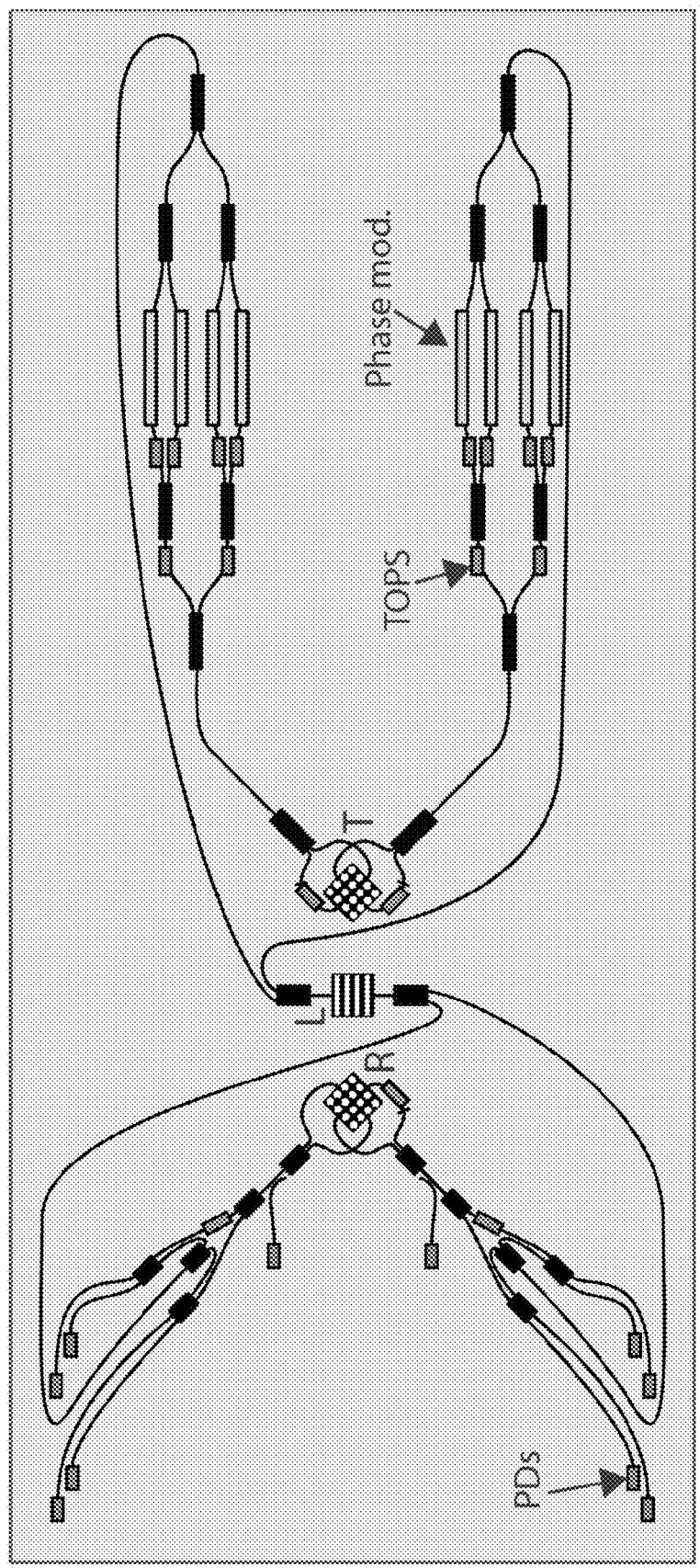
FIGS. 16(a) and 16(b) show a schematic top view of a 3-port coherent transceiver PIC using a non-tilted fiber array according to yet another aspect of the present disclosure.
Figure 16B:
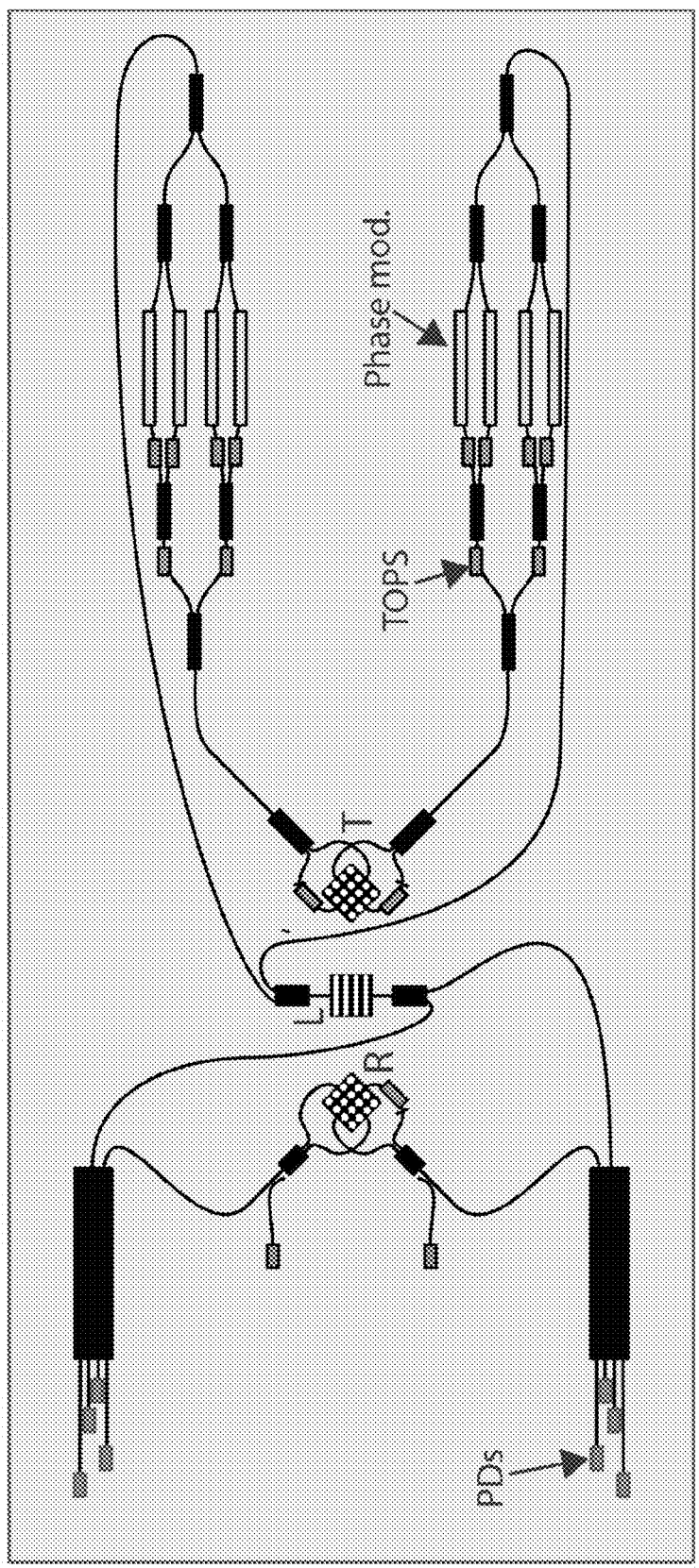

FIG. 15 and FIGS. 16a and b depict further arrangements according to the present disclosure. In FIGS. 15 and 16a, the 90-degree hybrids are constructed from 1×2 and 2×2 couplers. In FIG. 16b, the 90-degree hybrids are 2×4 couplers There are TOPS in the 2-D grating coupler combining paths for the R and T ports to control the relative phase between the two combining paths. These TOPS, in conjunction with the interferometer formed by the grating coupler and combining paths, may also be used as VOAs when the combining paths are not perfectly in phase.

Figure 17:
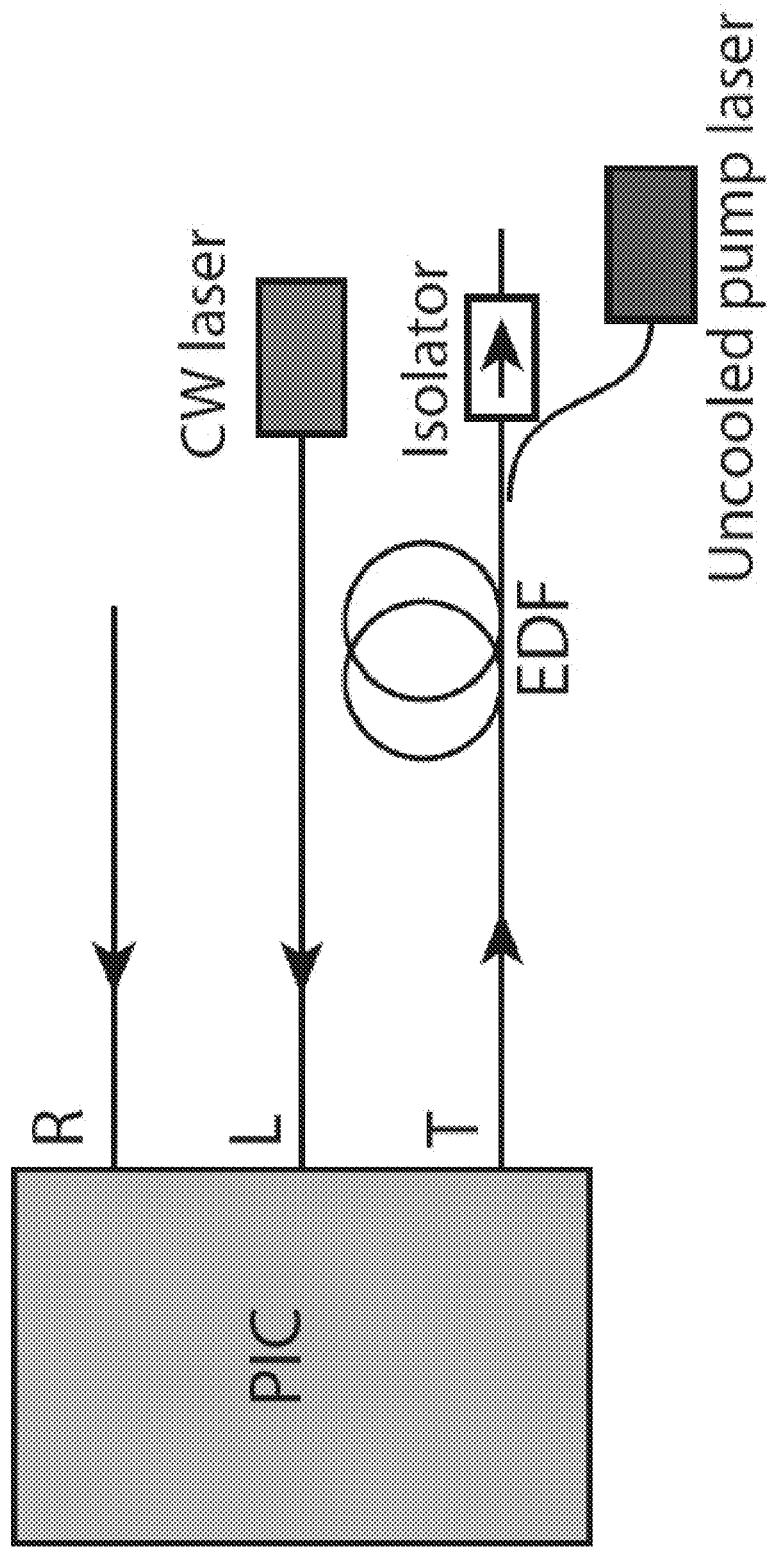
FIG. 17 shows a schematic of a PIC and an erbium-doped fiber amplifier (EDFA) according to an aspect of the present disclosure.

As may be appreciated, because a monolithic PIC such as those shown and described have trade-offs as compared with discrete components, the insertion loss is typically higher then with discrete components. To make up for this loss, we may advantageously position an Er-doped fiber amplifier on the transmitter output. As may be appreciated, this amplifier may be pumped by an uncooled 980 or 1480 nm pump laser, which typically consumes less than 1 W of power. The optical amplifier may be positioned within the same module as the PIC package. Such a configuration is shown schematically in FIG. 17.

Figure 18:
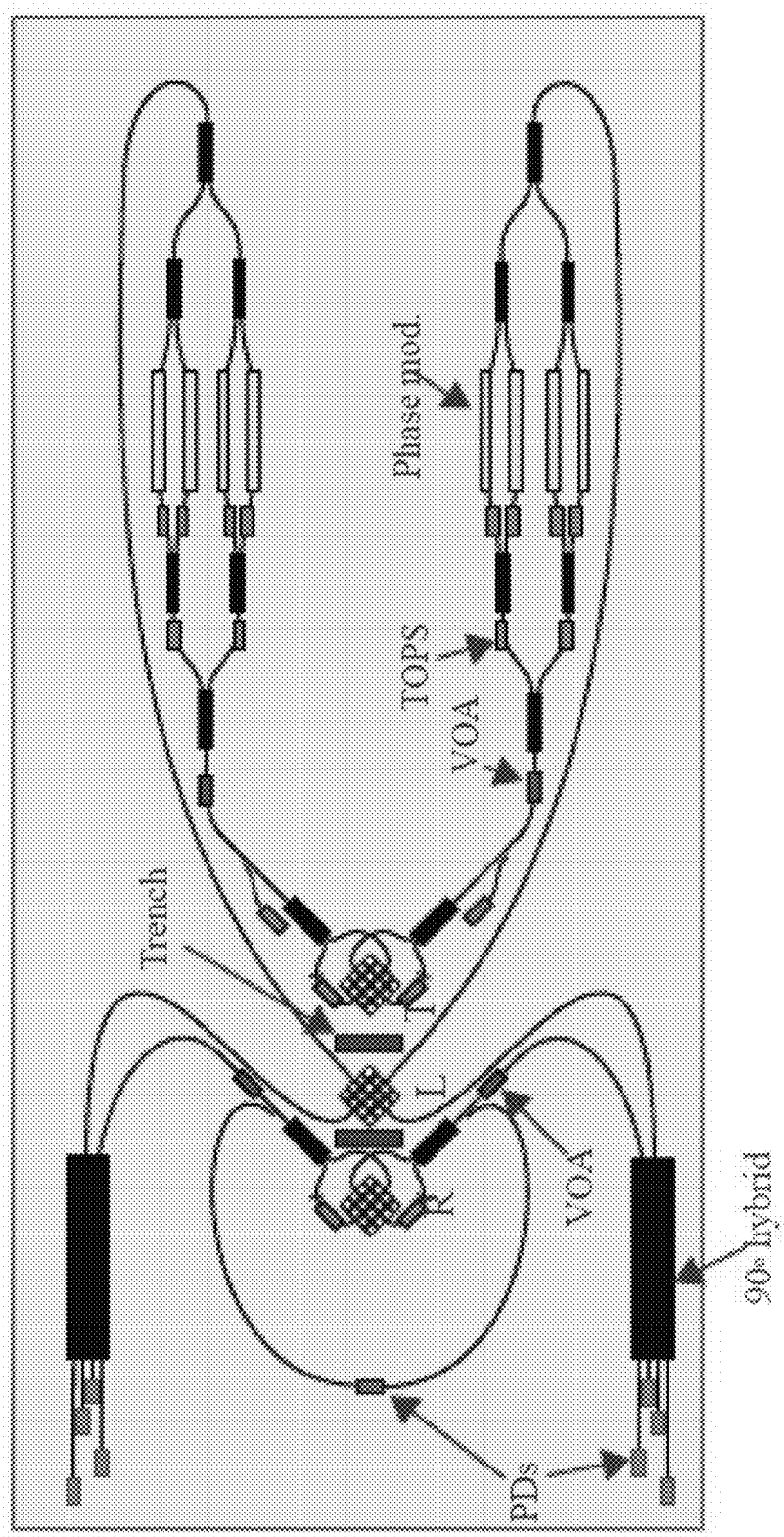
FIG. 18 shows a schematic top view of a 3-port coherent transceiver PIC using a non-tilted fiber array according to yet another aspect of the present disclosure wherein all grating couplers are 2-D couplers and trenches are employed in the substrate.

FIG. 18 shows in schematic form yet another alternative configuration according to the present disclosure. In the configuration of FIG. 18, the L grating coupler is a non-tilted 2-D grating coupler. All four outputs are used as effective power splitters of the laser. This permits the L grating coupler to be exactly the same design as the R and T grating couplers, thereby minimizing design and fabrication issues. There are trenches etched between the grating couplers. This prevents scattered light from crossing directly between ports, since the L port will typically exhibit a much higher power than the R and T ports.

Figure 19:
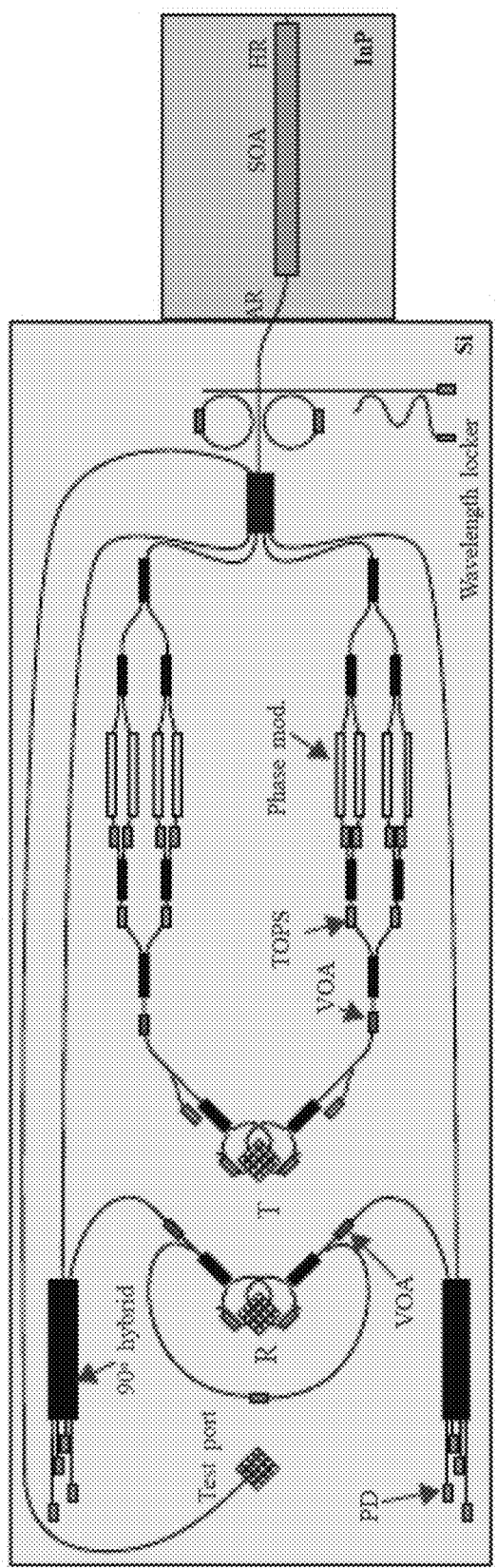
FIG. 19 shows a schematic top view of a 3-port coherent transceiver PIC according to yet another aspect of the present disclosure wherein a laser extended cavity is also fabricated on the same substrate coupled to a separate optical gain chip including a test port.

Finally, FIG. 19, shows in schematic form an integrated receiver and modulator on a single Si chip along with an integrated extended cavity for a narrow line width tunable laser in the Si. The optical gain for the laser comes from an InP chip that includes only a semiconductor optical amplifier and therefore can be low cost and made by high yield processes. The InP chip is attached to the Si chip preferably with an index-matching adhesive.

As depicted in FIG. 19, one end of the cavity comprises HR-coated facet on the InP chip and the other end comprises ring resonators in the Si. The two ring resonators have slightly different free-spectral ranges, so that they can be Vernier tuned to tune the wavelength over a wider range. Light on resonance couples to the perpendicular waveguide and couples back to the rings and returns to the InP chip. Of course other configurations of this extended cavity in the Si are possible and contemplated. The extended cavity may also be constructed from another, Si-compatible material, such as SiN. The Si chip is shown also including a wavelength locker integrated onto the same chip for controlling the laser wavelength. Also included in this configuration is a test grating coupler port such that the receiver and modulator may be tested on wafer using vertically coupled fibers.

While the methods, systems, and apparatus according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An optical coherent transceiver comprising a monolithically integrated electrical and optical circuit having a substrate with a planar surface onto which is formed a polarization and phase-diversity coherent receiver and a polarization and phase-diversity modulator, and said optical coherent transceiver including only three optical Input/Output ports employing only three grating couplers, the first grating coupler optically connected to the polarization-diversity receiver, the second grating coupler optically connected to the receiver and the input of the polarization-diversity modulator, and the third grating coupler optically connected to the output of said modulator;
wherein one of the grating couplers couples in to the transceiver a modulated signal, a second one of the grating couplers couples in to the transceiver a continuous-wave signal, and a third one of the grating couplers couples out a modulated signal.

2. The optical transceiver according to claim 1 wherein the three grating couplers are connected to a fiber assembly including optical fiber having a bend radius less than 8 mm.

3. The optical transceiver according to claim 2 wherein the fiber assembly is vertical to within 2 degrees of the substrate surface.

4. The optical transceiver according to claim 1 wherein all three grating couplers are 2-D grating couplers.

5. The optical transceiver according to claim 1 wherein one grating coupler is a 1-D grating coupler and the other two are 2-D grating couplers.

6. The optical transceiver according to claim 1 wherein the substrate is a Si substrate.

7. The optical transceiver according to claim 1 wherein TOPS are included in the combining paths of a grating coupler such that VOA functionality is provided.

8. The optical transceiver according to claim 1 further comprising an external laser module that provides the continuous-wave signal.

9. The optical transceiver according to claim 8 wherein said continuous-wave signal provides both transmitter and local oscillator functions.

* * * * *

UNITED STATES PATENT AND TRADEMARK OFFICE
CERTIFICATE OF CORRECTION

PATENT NO. : 9,195,079 B2  
APPLICATION NO. : 13/733108  
DATED : November 24, 2015  
INVENTOR(S) : Christopher Doerr et al.

Page 1 of 1

It is certified that error appears in the above-identified patent and that said Letters Patent is hereby corrected as shown below:

On the title page item (57),
In the Abstract, at line 4, delete "on grating coupler" and replace it with --one grating coupler--.

Signed and Sealed this
Twenty-ninth Day of March, 2016

Michelle K. Lee
*Director of the United States Patent and Trademark Office*